Oct. 19, 1965 W. P. KEMPER 3,212,644
SEWAGE INTERCEPTOR TRAP
Filed April 11, 1963 3 Sheets-Sheet 1
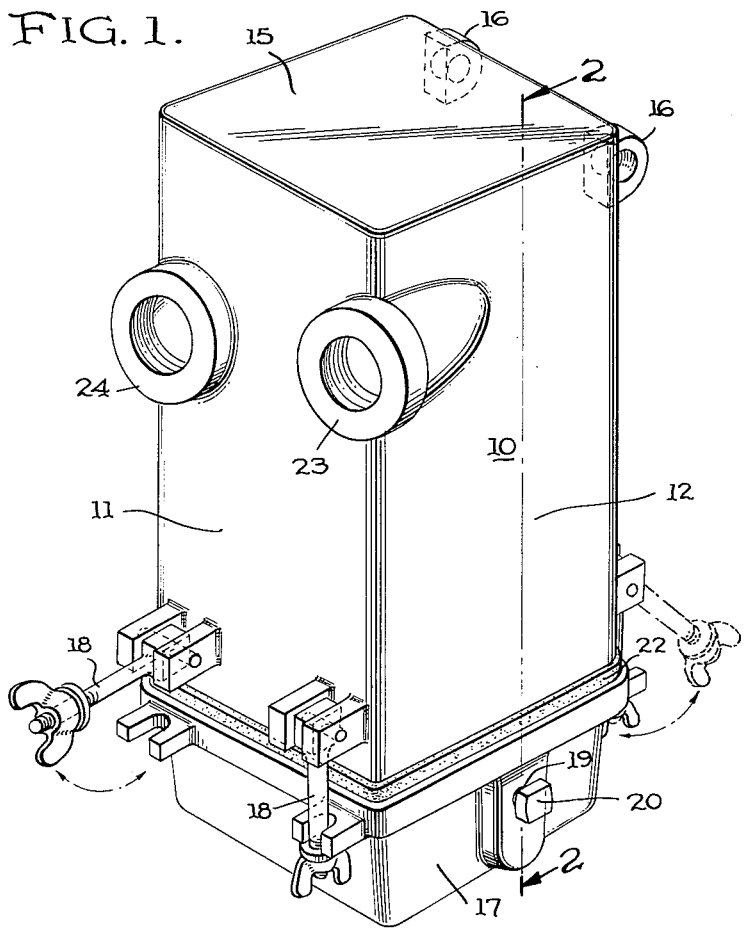
INVENTOR
WILLIAM P. KEMPER
BY
Cameron, Kerkam & Sutton
ATTORNEYS

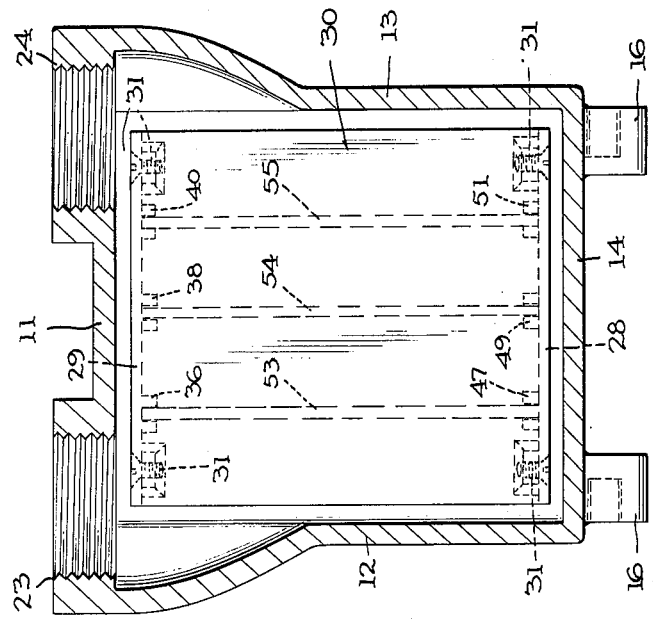
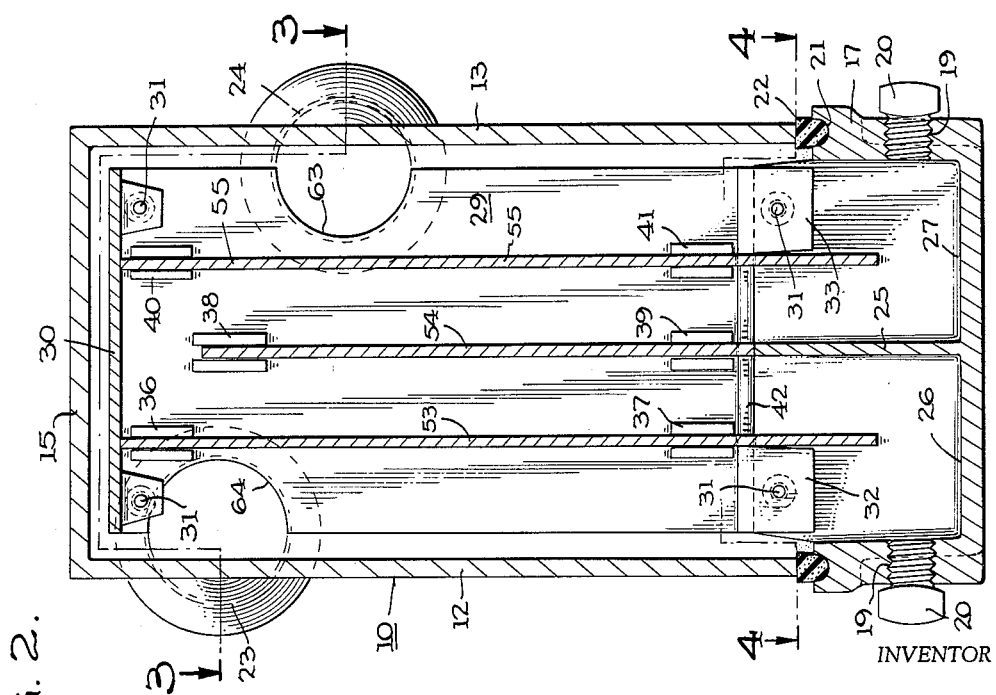

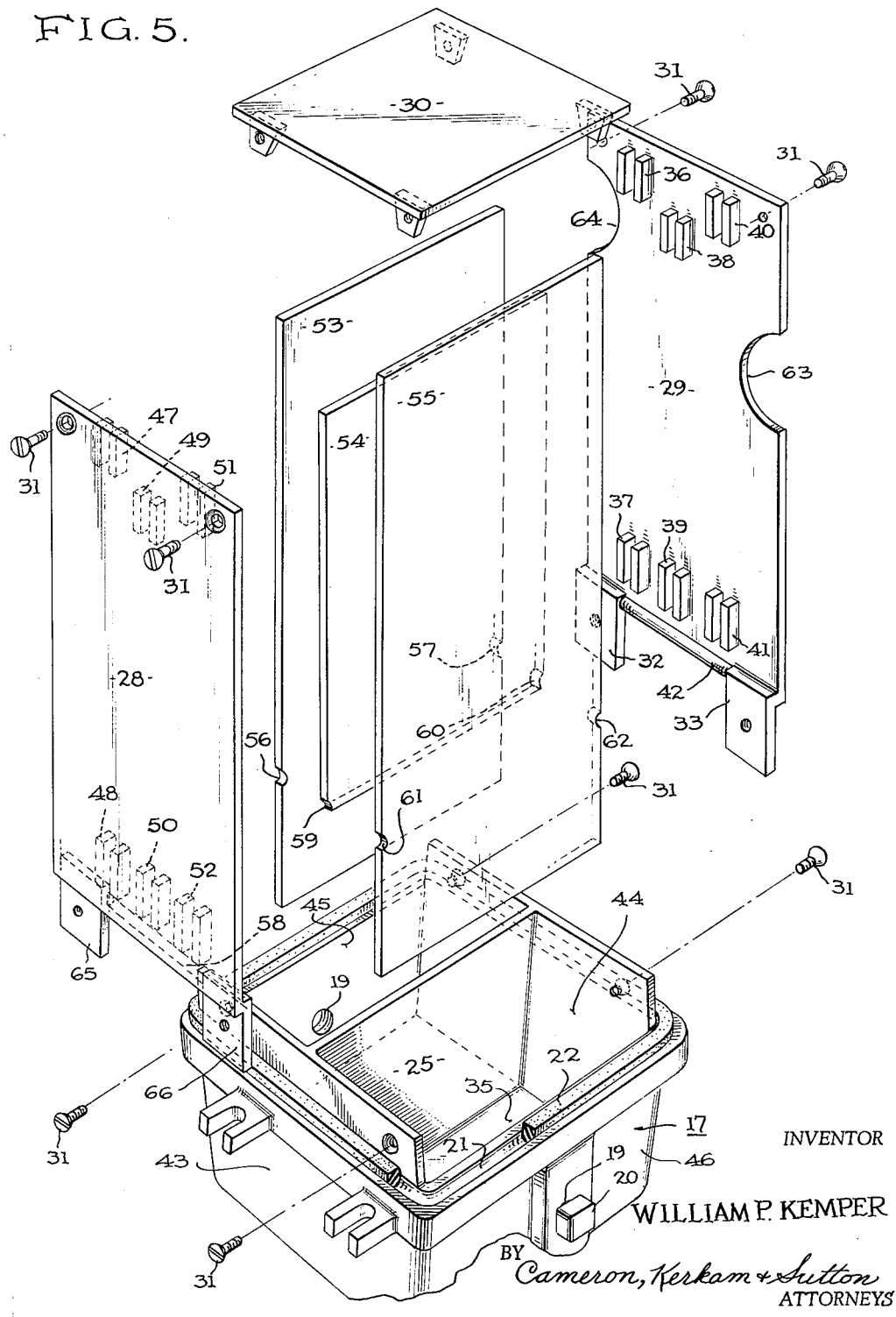

3,212,644
SEWAGE INTERCEPTOR TRAP
William P. Kemper, Memphis, Tenn., assignor to University of Tennessee Research Corporation, Knoxville, Tenn., a corporation of Tennessee
Filed Apr. 11, 1963, Ser. No. 272,419
5 Claims. (Cl. 210—532)

This invention relates to sewage interceptor traps and more particularly to such traps for the removal of fine particles such as plaster and wax from waste water to prevent clogging of sewer pipes. Even more particularly this invention relates to such traps particularly useful in dental laboratories for the removal of plaster and wax from waste water.

Heretofore various types of traps have been proposed for the removal of fine particles from waste water which would otherwise clog the sewer pipe. Most of these traps utilize screens for the removal of the fine particles. If the fine particles are of plaster or wax as found in the waste water from dental laboratories, the screens soon become clogged and frequent cleaning of the trap is required. Cleaning plaster and wax from screen is almost impossible and such cleaning will usually damage the screens to such an extent that it is necessary to replace them which is costly.

Further, in known traps the inlet and outlet are located on opposite sides of the trap. This is inconvenient where the trap is to be used in a restricted space. It is therefore most advantageous, as in the present invention, to provide the inlet and outlet on the same side of the trap.

It is therefore the object of the present invention to provide a novel sewage interceptor trap particularly suitable for the removal of plaster and wax from waste water from dental laboratories which trap is suitable for use in restricted space having the inlet and outlet thereof on the same side of the trap.

Another object is to provide such a trap which can be readily dismounted and cleaned and does not require the use of screens or perforated partitions for the removal of fine impurities from the waste water.

Another object of the present invention is to provide such a trap in which expansion of the waste water and reduction of velocity thereof is utilized to deposit the fine particles to remove them from the waste water.

Another object is to provide such a trap having baffles which change the direction of flow of the waste water a plurality of times to cause deposit of the impurities therein.

Other and further objects of the present invention will appear from the following description of an illustrative embodiment thereof. This illustrative and preferred embodiment should not be construed as defining or limiting the present invention.

The trap of the present invention is capable of various mechanical embodiments, one of which is illustrated in the accompanying drawings and is described hereinafter as a preferred embodiment of the invention. In the accompanying drawings in which like reference characters indicate like parts.

FIG. 1 is an elevational view of an embodiment of the present invention showing the inlet and the outlet thereof opening from the same side and showing how the elements thereof are assembled;

FIG. 2 is a sectional view on the line 2—2 of FIG. 1;
FIG. 3 is a sectional view on the line 3—3 of FIG. 2;
FIG. 4 is a sectional view on the line 4—4 of FIG. 2; and
FIG. 5 is an exploded view of the baffle plate construction employed in the embodiment of FIG. 1.

Referring now to the several figures, the sewage interceptor trap thereof comprises an upper container generally indicated at 10 of parallelopipedal construction having a front wall 11, side walls 12 and 13, having a back wall 14 and a top 15. Suitable lugs 16 are mounted on back wall 14 for hanging or supporting the trap from an adjacent wall or bracket. The open bottom of container 10 is closed by a tray 17 having a front wall 44, a rear wall 43, side walls 45 and 46 and a bottom 35 which is secured to container 10 by lock bolts 18 of suitable construction. Tray 17 is provided with drainage outlets 19 in walls 45 and 46 normally closed by suitable plugs 20. Tray 17 is grooved at 21 around its upper periphery to receive gasket 22 which engages the lower edge of container 10 to form a fluid tight seal between container 10 and tray 17.

Container 10 is provided with a waste water inlet 24 and a waste water outlet 23 both of which are connected into the sewage disposal system in known manner.

Tray 17 is divided by a partition 25 extending between walls 43 and 44 and engaging bottom 35 into two compartments 26 and 27. Baffle support plates 29 and 28 are spaced and secured in position opposite each other by cleats 32 and 33 and 65 and 66 are bolted to extended sides 44 and 43 respectively and by top plate 30, plates 29 and 28 and top 30 together with cleats 32, 33, 65 and 66 being held in assembled position by flat head countersunk bolts 31. Plate 29 extends into engagement with the adjacent extended upper edge of side 44 of tray 17 inside gasket 22 when the trap is assembled.

Plate 29 is provided with opposed spaced pairs of parallel lugs 36 and 37; 38 and 39; and 40 and 41. A rod or upstanding surface 42 extends between cleats 32 and 33.

Plate 28 is of similar construction to plate 29 and rests upon the adjacent extended upper edge side 43 of tray 17 inside gasket 22 when the trap is assembled. Plate 28 carries spaced parallel pairs of lugs 47 and 48; 49 and 50; and 51 and 52. A rod or outstanding surface 58 extends between cleats 65 and 66. Pair of lugs 47 and 48 are disposed opposite to pair of lugs 36 and 37; lugs 49 and 50 are opposite lugs 38 and 39; and lugs 51 and 52 are opposite pair of lugs 40 and 41 when the baffle plate construction is assembled.

Baffle plate 53 extends between pairs of lugs 47 and 48 and 36 and 37 and is provided with notches 56 and 57 to engage rods or surfaces 58 and 42, respectively. Baffle plate 54 extends between pairs of lugs 49 and 50 and 38 and 39 and is provided with notches 59 and 60 to engage rods or surfaces 58 and 62, respectively. Baffle plate 55 extends between pairs of lugs 51 and 52 and 40 and 41 and is provided with notches 61 and 62 to engage rods or surfaces 58 and 42, respectively. Plate 54 is shorter than plates 53 and 55 and when the trap is in assembled position rests upon partition 25.

Plate 29 is cut away at 63 opposite inlet 24 and is similarly cut away at 64 opposite outlet 23. Cut away portions 63 and 64 provide for uninterrupted ingress and egress of the waste water to and from the trap.

As will be seen from FIG. 2, baffle plate 54 rests upon partition 25 when the trap is assembled and is spaced from top 30. Baffle plate 53 engages top 30 and extends downwardly into compartment 26 and is spaced from the bottom thereof while baffle 55 extends from top 30 into compartment 27 and is spaced from the bottom thereof. Water entering at 24 therefore passes downwardly in the space between baffle 55 and wall 13 into compartment 27 and beneath baffle 55. The flow of waste water is turned in compartment 27 upwardly between baffles 55 and 54 and is turned again over the top of baffle 54 downwardly between baffles 54 and 53 into compartment 26. The flow of waste water is again turned in compartment 26 beneath baffle 53 and flows upwardly between baffle 53 and wall 12 and out of the trap at 23. Reduction of the velocity of the waste water by its tortuous path between the several baffles, as above described, causes precipitation of the fine particles from the waste water, particularly plaster and wax, which collect in compartments 26 and 27. Compartments 26 and 27 can be drained and cleaned when required by removal of plugs 20.

When the entire trap requires cleaning, tray 17 can be removed easily by releasing bolts 18 and the baffle plate assembly leaves container 10 as tray 17 is withdrawn. The several components of the baffle plate structure can be readily dismounted by the removal of bolts 31 for the ready cleaning of the elements thereof and for quick and easy reassembly.

It should now be apparent to those skilled in the art that the present trap in every way satisfies the several objectives discussed above.

What is claimed is:

1. In a sewage interceptor trap, a container, an open bottom and a closed top for said container, a closure tray mounted on said container and closing said bottom, waste water inlet and outlet openings in said container adjacent each other and adjacent said top, spaced plates supported on said tray within said container, a top secured to said plates adjacent said first mentioned top, at least three spaced baffle plates extending between said first mentioned plates, a partition in said tray, a first of said baffle plates resting on said partition and terminating short of said second mentioned top, a second of said baffle plates spaced from and on one side of said first baffle plate extending from said second top into but short of the bottom of said tray and a third of said baffle plates extending from said second top on the opposite side of and spaced from said first baffle plate into but short of the bottom of said tray, said baffle plates extending parallel to the axes of said inlet and outlet openings.

2. A trap as described in claim 1, said plate adjacent said inlet and outlet openings being cut away adjacent thereto.

3. A trap as described in claim 1 including notches in said baffle plates and raised surfaces on each of said plates engaging in said notches.

4. A trap as described in claim 1 including spaced pairs of lugs on said plates receiving said baffle plates.

5. A trap as described in claim 1 including spaced pairs of lugs on said plates receiving said baffle plates, notches in said baffle plates and raised surfaces on each of said plates engaging in said notches.

References Cited by the Examiner

UNITED STATES PATENTS

| 789,016 | 5/05 | Franks | 210—305 |
| 2,369,915 | 2/45 | Quinn | 210—282 X |
| 2,561,507 | 7/51 | Gordon | 210—238 X |

REUBEN FRIEDMAN, *Primary Examiner.*